US011875618B1

(12) United States Patent
Rais

(10) Patent No.: US 11,875,618 B1
(45) Date of Patent: Jan. 16, 2024

(54) ALTERNATIVE ELECTRONIC AND KEYLESS MECHANICAL SINGLE LOCK CONTROL

(71) Applicant: Elliot Rais, New York, NY (US)

(72) Inventor: Elliot Rais, New York, NY (US)

( * ) Notice: Subject to any disclaimer, the term of this patent is extended or adjusted under 35 U.S.C. 154(b) by 0 days.

(21) Appl. No.: 18/235,878

(22) Filed: Aug. 20, 2023

Related U.S. Application Data

(60) Provisional application No. 63/628,249, filed on Jul. 3, 2023.

(51) Int. Cl.
*G07C 9/00* (2020.01)

(52) U.S. Cl.
CPC .................... *G07C 9/00174* (2013.01); *G07C 2009/00222* (2013.01); *G07C 2009/00587* (2013.01); *G07C 2009/00825* (2013.01)

(58) Field of Classification Search
CPC .................. G07C 9/00; G07C 9/00174; G07C 2009/00222; G07C 2009/00587; G07C 2009/00825
USPC .......................................................... 70/279.1
See application file for complete search history.

(56) References Cited

U.S. PATENT DOCUMENTS 4,912,460 A * 3/1990 Chu .................. G07C 9/00658 340/5.67
2005/0099262 A1* 5/2005 Childress ................ G07C 9/21 340/5.6
2018/0298639 A1* 10/2018 Rais .................... E05B 47/0001
2018/0336748 A1* 11/2018 Rais .................... E05B 47/0676

FOREIGN PATENT DOCUMENTS

DE 202021100165 U1 * 3/2021 ......... E05B 47/0615

* cited by examiner

*Primary Examiner* — Suzanne L Barrett
(74) *Attorney, Agent, or Firm* — Israel Nissenbaum; Yitzy Nissenbaum

(57) ABSTRACT

A lock for an access door having an electrically powered electronic smart lock control and a keyless mechanical lock control, and a single locking bolt element. The single locking bolt element is made movably operable, to permit opening of the access door, with either of an electronic code entry via the electrically powered electronic smart lock control or a mechanical code entry via the keyless mechanical lock control. The mechanical lock control, with mechanical code entry, thereby provides a fail-safe back up for keyless entry through the access door in the event of electrical failure on the electronic smart lock.

8 Claims, 3 Drawing Sheets

50
A
60
A
Reset
Front View
18

Cross Section A-A
L1 L2
61
Receptor for Smart Lock
Receptor for Mechanical Lock

ALTERNATIVE ELECTRONIC AND KEYLESS MECHANICAL SINGLE LOCK CONTROL

FIELD OF INVENTION

This invention relates to electronic smart locks and particularly relates to expedients for permitting mechanical keyless operation of the lock even when the powering batteries no longer provide requisite energy to operate the lock or in the event of a power blackout with a hard-wired electronic lock.

BACKGROUND OF INVENTION

Electronic smart locks, defined herein as electrically-controlled (and often battery powered) locks for latching and unlatching, are sometimes configured to be controlled remotely to perform valuable functions, including the basic function of locking and unlocking a door, assigning or deleting access combination codes, testing the lock's battery level, receiving notifications when an access code was used in opening a door and receiving alerts when the lock battery is low. A code is entered such as on an electronic keyboard or pad or with biometric methods such as fingerprints, eye scanning and the like, and, if correct, allows for an initial mechanical movement to activate an opening access (such as a simple removal of a bolt restraint). A mechanical procedure, such as turning a knob or moving a lever, or other commonly used mechanical methods and structures, is then utilized to actually physically open the lock. With such basic functions, no mechanical keys are required or expedients for securely hiding it. While these remote functions are all valuable functions, the basic one of unlocking the door is of utmost importance, with the primary requirement being certainty that the door lock will function 100% of the time including during power outages.

Thus, with rental units (a common utilization of electronic locks to provide the security, without mechanical key operation and the possibility of keys being inappropriately retained or copied) if a rental guest arrives in the middle of the night, from 1,000 miles away or even from another continent and armed only with an electronic door code, and the lock fails to open, that is a nightmare of epic proportions, with little, if any, available options for entry. Such failure conditions are a very real possibility since electronic door locks are primarily dependent on battery power for operation and a failed battery or one drained of sufficient operational power can and will disable a smart lock. Periodic battery maintenance is accordingly necessitated at end of battery life intervals. However, estimates of battery life vary extensively, making periodic maintenance uncertain. In addition, unexpected battery drain conditions can exacerbate the possibility of failure of the lock to operate at unexpected times. As another untoward event, power blackouts are usually unpredictable but need to be taken into account with the greater incidence of such events. Even personal use situations provide access entry problems during electrical blackouts or with powering battery failures.

In recognition of this, electronic lock manufacturers have tried to use various expedients including advance warning of battery failure (which is usually unreliable and also problematic, particularly if the rental site is remote from the owner, for effecting timely maintenance); configuring the locks with complicating manual mechanical overrides (requiring a separate key with security placement), providing access to spare batteries (an expedient also subject to battery depletion failure) or temporary battery charging mechanisms (complicated and still uncertain). Mechanical expedients such as hidden keys, further obviate the reasons for using the electronic locks in the first instance.

SUMMARY OF THE INVENTION

Smart locks are often battery powered and batteries can drain unexpectedly, resulting in a lockout. Power blackouts are also becoming more prevalent. Accordingly, it is an object herein to provide a self-contained 100% reliable hybrid mechanical/electronic emergency backup, for entry in case of electrical lock control malfunctions, which will enable unlocking of an electronic lock having a "dead" battery or a power blackout but without external and separate mechanical lock expedients such as keys and spare batteries.

Generally, the invention comprises a lock for doors, whether for rental or even personal purposes, with electrical and particularly battery powered electronic smart lock control and a keyless mechanical lock control wherein a single locking bolt element is operable with either of an electronic code entry and a mechanical code entry, wherein the mechanical lock control with mechanical code entry provides a fail-safe back up for keyless entry through an access door. As used herein, the term "electronic code entry" includes both typical electrically powered entry of letters, numerals or symbols but even biometric measures such as fingerprints, retinal and facial scans and the like, all of which require electrical power for operation. The term "mechanical code entry" includes any mechanical method of providing a non-electrical entry of a unique code, which is integrated with the lock (i.e., requiring no separate operational structure such as a key). In various embodiments, the locking bolt is operable, such as with an electronic pushbutton or keypad and also with a mechanical pushbutton, keyboard, alignable rotating ring combination and the like. In some embodiments both the electronic keypad entry and mechanical combination device (keypad, pushbutton, rotating combination and the like) control a restraint-release which enables the opening movement of a latch or dead bolt. In operation, the electronic or mechanical entry control provide a clearance entry whereby a knob or lever performs the actual movement of the latch or dead bolt, permitting opening of an access door. In a further embodiment, an electronic keypad is configured to function as a mechanical keypad should the electronic function fail such as with battery depletion. In such embodiment, both electronic and mechanical control activation code entries are active whereby if either a correct electronic or mechanical code is entered, clearance entry for opening the access door is affected. If the lock has lost electrical power (battery depletion or power blackout), a correct mechanical code entry permits opening of the access door.

In a typical embodiment, a latch or dead bolt is provided with a restraint hollow into which a restraint-release is fitted (typically positioned and moveable at right angles to the direction of normal latch or dead bolt movement. Correct combination of the electronic keypad or of the mechanical combination moves or enables the restraint to be moved out of the restraint hollow, thereby enabling the locking bolt to be moved, such as with a handle latch or rotating knob, out of inserted contact with a door strike and allows opening of the access door. In other embodiments the electrical and/or mechanical code entry activates operational engagement of the latch or dial control and the lock bolt to permit the mechanical control of opening bolt movement.

In operation, rental guests are provided with a combination code for the electronic smart-lock component keypad. In case of lock failure, rental guests contact the host (e.g., telephone, text, e-mail) for a back-up code to enter into the mechanical component keypad and the like. Alternatively, the rental guest is initially provided with both electrical lock control and mechanical lock control combinations or codes.

During the rental period, the guest continues to use the mechanical lock code combination and/or the electronic lock control code and can revert to use of the electronic lock control code, if the battery has been replaced (either by the guest or by requested maintenance) or an emergency power blackout has been resolved. After a rental guest has vacated the rental, the combination is reset remotely for the electronic lock. If the electronic lock has had a battery failure which has not been rectified with a battery replacement, normal post occupation maintenance and cleaning also includes battery replacement (with the new code being able to also be entered remotely). If a code for the mechanical lock control has been provided, the code is changed with the post occupation maintenance. Otherwise, it can be securely maintained.

With an advanced feature, and provided sufficient electrical power is available, the mechanical code may be set originally or reset remotely. However, the actual mechanical code entry must be done on site (without need for an electrical assist).

It is understood that the above configuration is only illustrative and that other dual electrical/mechanical controls are possible such as a freely movable bolt with the drive mesh of a gear interface mechanism between handle or dial and the bolt being operationally connected with meshing of the interface gears with entry of a correct electrical or mechanical code.

The above and other objects, features and advantages of the invention will become more evident from the following discussion and drawings in which:

SHORT DESCRIPTION OF THE DRAWINGS

DETAILED DESCRIPTION

Figure 1:
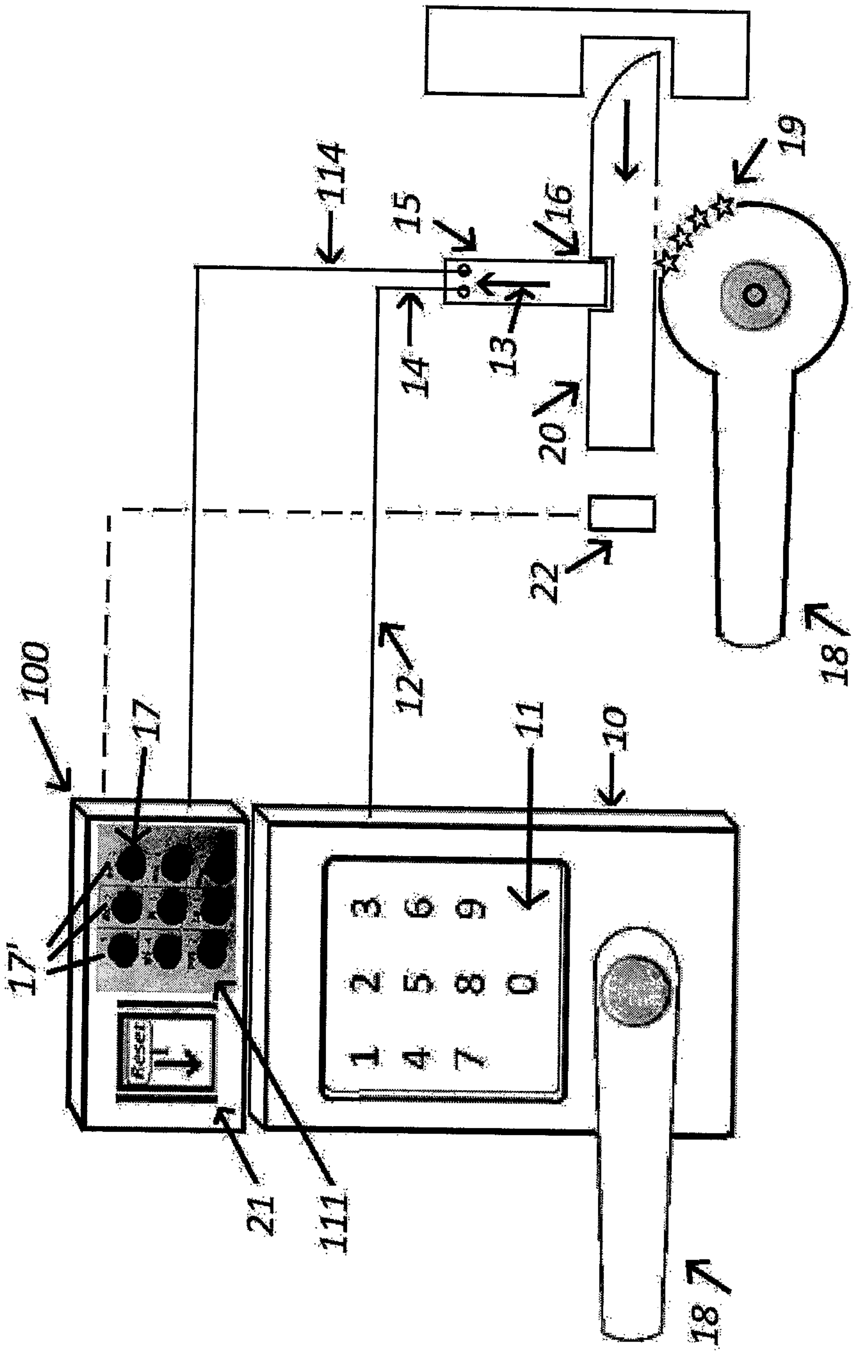
FIG. 1 illustrates a latch bolt, with an electronic smart lock, and a push button mechanical lock control with an illustrative call out of inner mechanical operation.
Figure 2:
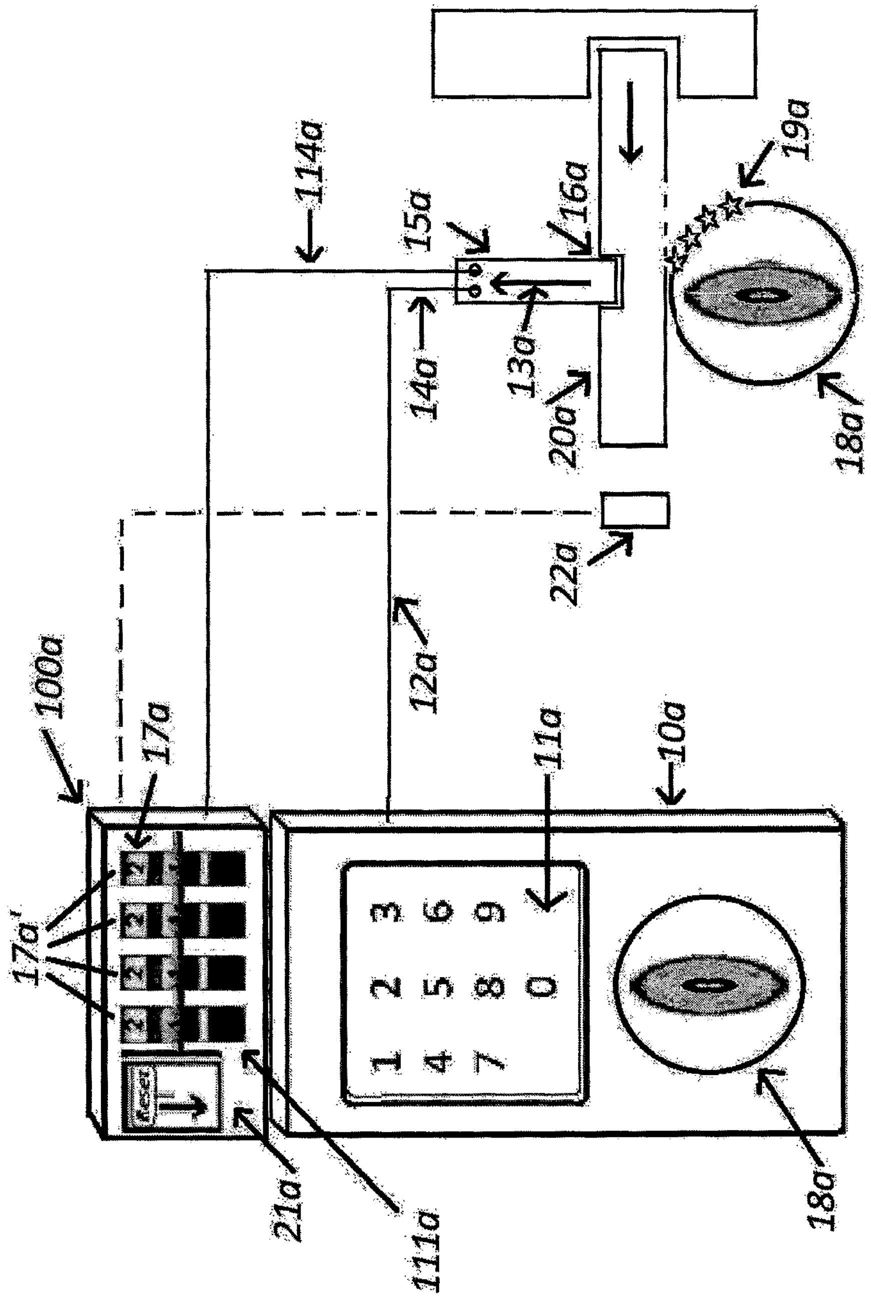
FIG. 2 illustrates a second embodiment of a dead bolt, with an electronic smart lock, and a rotating dial combination mechanical lock control with an illustrative call out of inner mechanical operation.

Operation of either lock (10, 10*a*) is identical with differences in bolt type (latch bolt 20 in FIG. 1 and dead bolt 20*a* in FIG. 2, type of mechanical code entry (push button pad 17 in FIG. 1 and dial combination 17*a* in FIG. 2) and bolt throwing mechanism (lever latch handle 18 in FIG. 1 and dial 18*a* in FIG. 2)

In the locks 10 and 10*a* of both FIGS. 1 and 2, normal entry is effected with entry of a combination code known to the user via the key pad 11 and 11*a*. When the correct smart lock code is manually entered into the electronic smart lock keypad 11 and 11*a*, a mechanical connection 12, 12*a*, such as an electrically operated solenoid exerts a pulling force, shown by arrows 13, 13*a* to vertically move lifting connector 14, 14*a* to lift the restraint 15, 15*a*, out of notch 16, 16*a* in locking bolts 20, 20*a*, thereby enabling the locking bolts 20, 20*a* to be moved manually (via geared interface 19, 19*a*) by lever latch handle 18 in FIG. 1 or dial 18*a*, unlocking the door (not shown).

Mechanically powered lock controls (100, 100*a*) in FIGS. 1 and 2 provide a fail-safe backup to the battery powered electronic controlled mechanism 10, 10*a*, by alternatively providing lifting of restraint 15, 15*a* with a separate mechanical connection 114, 114*a*. Entry of a push button code via keypad 111 in FIG. 1 or aligning a correct code combination in the dial 111*a* of FIG. 2 enables opening/reset control 21, 21*a* to be moved to activate mechanical connection 114, 114*a* to lift restraint 15, 15*a*. This provides an alternative back up mechanical control for moving the bolt (20, 20*a*) for opening of the door.

For security purposes, reset element 22, 22*a* is linked to the lock controls 100, 100*a* whereby, activation of lever handle 18 or dial 18*a* causes the pushbuttons 17' of push button pad 17 in FIG. 1 to return to their original unpressed state (spring loaded automatic return push buttons obviate the need for reset element 22) or mechanical dial elements 17*a*' in combination dial 17*a* to become randomly jumbled.

Figures 3A, 3B:
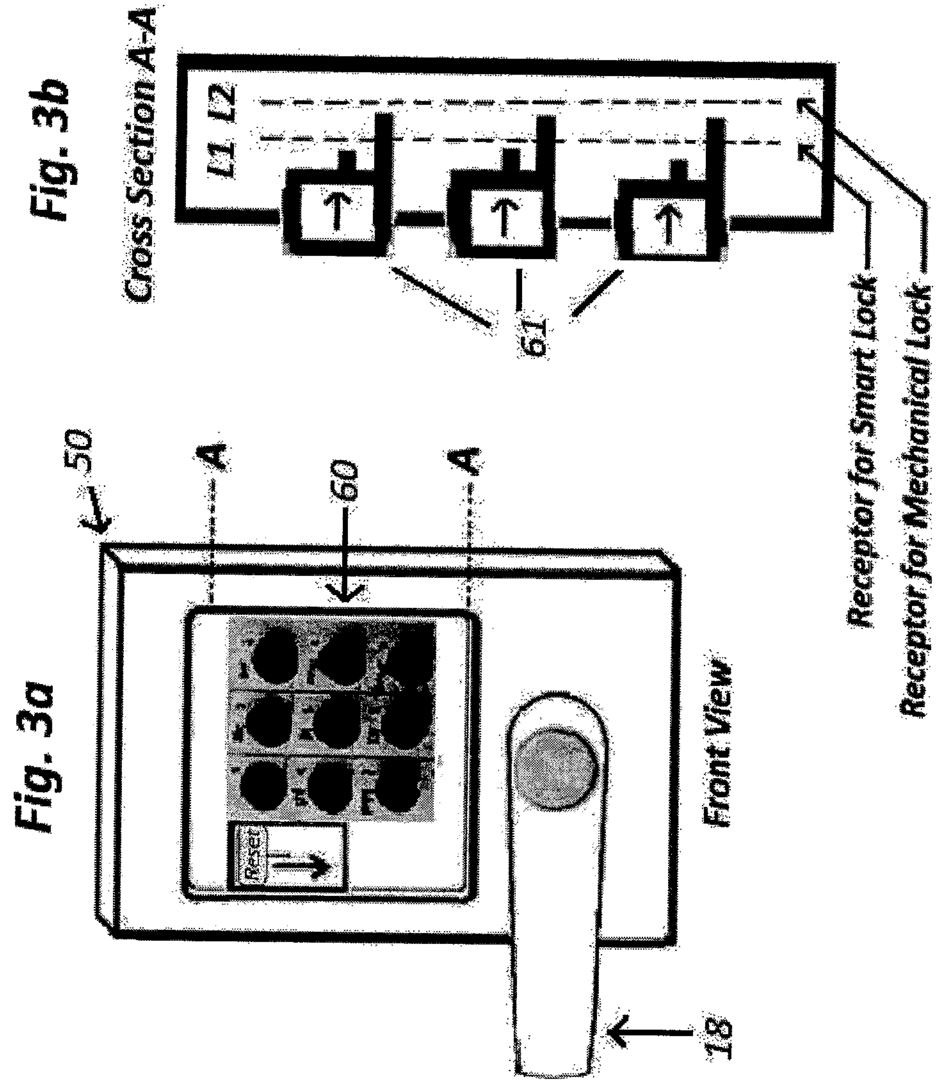
FIGS. 3A and 3B are views of an integrated single electrical and mechanical code entry key pad with alternative operative electrical and mechanical code entry functions with FIG. 3B being a cross section view of the key pad of FIG. 3A, taken along line A-A.

FIG. 3A depicts a lock 50 with an integrated keypad 60 having both electronic and mechanical operation code entry functions. As shown in cross section view A-A of FIG. 3B, the respective pushbutton code entry elements 61 have a dual depth depression level, with L1 being the shorter for electrical contact control and the lower level L2 for longer activation of mechanical controls beneath the electronic controls, for the separate mechanical code entry operations. Entry of a code provides both electronic and mechanical entry and if one is correct the access door is made openable. Thus, if electrical power is available, entry of either an electronic or a mechanical code provides for opening of the access door and if electrical power is not available, entry of the mechanical code effects ability to open the access door with removal of the restraint and operation of lever latch handle 18 remaining the same as in the embodiment of FIG. 1.

It is understood that the above description and illustrative drawings are merely exemplary of the invention, with changes in components, electrical and mechanical requirements and structure being possible without departing from the scope of the present invention as defined by the following claims.

What is claimed is:

1. A lock for an access door comprising an electrically powered electronic smart lock control and a keyless mechanical lock control, and a single locking bolt element, wherein the single locking bolt element is made movably operable to permit opening of the access door with either of an electronic code entry via the electrically powered electronic smart lock control and a mechanical code entry via the keyless mechanical lock control, wherein the mechanical lock control, with mechanical code entry, provides a fail-safe back up for keyless entry through the access door.

2. The lock of claim 1, wherein the electronic smart lock control and the keyless mechanical lock control alternatively effect movement to release a restraint from the single locking bolt element whereby the single locking bolt element is made movable to enable the access door locked with the lock to be opened.

3. The lock of claim 1, wherein electrical power for the electronic smart lock control comprises an electrical battery.

4. The lock of claim 2, wherein the electronic smart lock control comprises a keypad configured for the electronic entry of a predetermined code to mechanically permit the bolt element to be made movably operable to permit opening of the access door with release of the restraint and wherein the keyless mechanical lock control comprises one of a keypad, pushbuttons and alignable rotating combination rings.

5. The lock of claim 1, wherein the movably operable single bolt element is mechanically moved by one of a controlling handle lever and a rotating controlling dial.

6. The lock of claim 5, wherein the single locking bolt element and controlling handle lever and rotating controlling dial comprise meshing gears between the single bolt element and the controlling handle lever or rotating controlling dial wherein entry of the electronic code or mechanical code effects meshing of the respective gears to permit the single locking bolt element to be made movably operable.

7. The lock of claim 1 wherein the electronically powered smart lock control and keyless mechanical lock control are integrated in a single keypad whereby, with entry of either an electronic code or a mechanical code, the single locking bolt element is made movably operable to permit opening of the access door.

8. The lock of claim 1, wherein the mechanical code entry is electrically remotely reset and wherein entry and operation of the mechanical lock control is operable in the absence of electrical operational supply.

* * * * *